(12) United States Patent
Sripada et al.

(10) Patent No.: US 10,172,051 B2
(45) Date of Patent: Jan. 1, 2019

(54) METHOD AND SYSTEM FOR OPTIMIZING SERVICE RECOVERY DURING CLOSED SUBSCRIPTION GROUP (CSG) SELECTION IN WIRELESS COMMUNICATION

(71) Applicant: Samsung Electronics Co., Ltd., Gyeonggi-do (KR)

(72) Inventors: Ravi Krishna Hari Haran Sripada, Bangalore (IN); Jaya Prakash Sivapuram, Bangalore (IN)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 15/161,874

(22) Filed: May 23, 2016

(65) Prior Publication Data

US 2016/0373977 A1    Dec. 22, 2016

(30) Foreign Application Priority Data

Jun. 22, 2015    (IN) .................... 3124/CHE/2015 CS

(51) Int. Cl.

| | |
|---|---|
| *H04W 36/04* | (2009.01) |
| *H04W 48/14* | (2009.01) |
| *H04W 48/18* | (2009.01) |
| *H04W 48/20* | (2009.01) |
| *H04W 84/04* | (2009.01) |
| *H04W 8/18* | (2009.01) |
| *H04W 36/00* | (2009.01) |

(52) U.S. Cl.
CPC .......... *H04W 36/04* (2013.01); *H04W 48/14* (2013.01); *H04W 48/18* (2013.01); *H04W 48/20* (2013.01); *H04W 8/186* (2013.01); *H04W 36/0083* (2013.01); *H04W 84/045* (2013.01)

(58) Field of Classification Search
CPC ..... H04W 48/18; H04W 4/08; H04W 84/045; H04W 48/02; H04W 12/06; H04W 36/0022; H04W 36/04; H04W 36/24
See application file for complete search history.

(56) References Cited

U.S. PATENT DOCUMENTS

| 8,630,641 | B2 | 1/2014 | Kim et al. |
| 8,934,334 | B2 * | 1/2015 | Kim ...................... H04W 24/04 370/216 |
| 9,713,039 | B2 * | 7/2017 | Watfa ................ H04W 36/0033 |
| 2010/0075665 | A1 | 3/2010 | Nader et al. |

(Continued)

FOREIGN PATENT DOCUMENTS

EP    2365718 A1 *    9/2011    ............ H04W 12/06

*Primary Examiner* — Matthew C Sams
(74) *Attorney, Agent, or Firm* — The Farrell Law Firm, P.C.

(57) ABSTRACT

Methods and apparatuses are provided for optimizing service recovery during manual closed subscription group (CSG) cell selection in a long term evolution (LTE) network. A user equipment (UE) receives a registration rejection with a temporary cause from a network of a CSG cell selected through the manual CSG cell selection. It is determined from the registration rejection whether the temporary cause comprises a cause value that allows the UE to return to a saved or previously visited public land mobile network (PLMN). Service recovery of the UE is performed with a registered PLMN (RPLMN), if the temporary cause does not comprise the cause value that allows the UE to return to the saved or previously visited PLMN.

16 Claims, 3 Drawing Sheets

(56) References Cited

U.S. PATENT DOCUMENTS

| | | | | |
|---|---|---|---|---|
| 2010/0112980 A1* | 5/2010 | Horn | ............... | H04W 48/20 |
| | | | | 455/411 |
| 2012/0044867 A1* | 2/2012 | Faccin | ............... | H04W 60/00 |
| | | | | 370/328 |
| 2012/0157095 A1* | 6/2012 | Fodor | ............... | H04W 4/08 |
| | | | | 455/434 |
| 2013/0148565 A1* | 6/2013 | Jactat | ............... | H04W 8/183 |
| | | | | 370/312 |
| 2013/0316699 A1* | 11/2013 | Jheng | ............... | H04W 48/18 |
| | | | | 455/423 |
| 2015/0092665 A1* | 4/2015 | Choi | ............... | H04W 36/08 |
| | | | | 370/328 |
| 2015/0094062 A1* | 4/2015 | Niemi | ............... | H04W 60/00 |
| | | | | 455/435.2 |
| 2015/0126189 A1* | 5/2015 | Rao | ............... | H04W 48/18 |
| | | | | 455/435.2 |
| 2015/0163726 A1* | 6/2015 | Bansal | ............... | H04W 48/16 |
| | | | | 455/434 |
| 2015/0264604 A1* | 9/2015 | Devarayanigari | ............... | |
| | | | | H04W 36/0022 |
| | | | | 370/331 |
| 2016/0227396 A1* | 8/2016 | Lee | ............... | H04W 76/30 |
| 2016/0242138 A1* | 8/2016 | Basavaraj | ............... | H04W 48/20 |
| 2016/0373977 A1* | 12/2016 | Sripada | ............... | H04W 36/04 |

\* cited by examiner

METHOD AND SYSTEM FOR OPTIMIZING SERVICE RECOVERY DURING CLOSED SUBSCRIPTION GROUP (CSG) SELECTION IN WIRELESS COMMUNICATION

PRIORITY

This application claims priority under 35 U.S.C. § 119(a) to an Indian Complete Patent Application No. 3124/CHE/2015 (CS), filed in the Indian Intellectual Property Office on Jun. 22, 2015, the content of which is incorporated herein by reference.

BACKGROUND

1. Field of the Disclosure

The present disclosure relates generally to wireless communication, and more particularly, to a method and system for optimizing service recovery of user equipments (UEs) during manual closed subscriber group (CSG) selection in wireless communication.

2. Description of the Related Art

In a long term evolution (LTE) network, a home base station, which may be referred to as a femto base station or a pico base station, is considered to be a promising solution for many issues, such as coverage, capacity, and cost, in a mobile communication network. The home base station delivers an improved user experience in homes, office buildings, or schools, at a very low cost, using the customer's broadband access (e.g., a digital subscriber line (DSL) or cable television backhaul). The home base station usually provides a small cellular coverage that only permits access by and provides service to the restricted group of users, which can be referred as to a CSG. Such cells providing the small cellular coverage are referred to as femto-cells, home node B (HNB) cells, home e-node B (HeNB) cells or, most commonly, CSG cells.

The CSG cell may be accessible only for a limited set of User Equipments (UEs) (i.e. closed subscriber group). In order to prevent a UE from attempting to register on a CSG cell on which they do not have access, the UE maintains an allowed CSG list. The allowed CSG list is a list of CSG identifiers (IDs) to which the UE has been granted access. A CSG ID is broadcast by the corresponding CSG cell and used by the UE to facilitate access for authorized members of the CSG.

The CSG identifies operator subscribers who are permitted to access one or more cells of a public land mobile network (PLMN) that have restricted access. In an automatic mode of CSG cell selection, an access stratum (AS) utilizes a list in the UE (i.e., a combination of an operator CSG list and an allowed CSG list) to re-select/handover to a CSG cell. In a manual mode of CSG cell selection, the available CSGs are scanned and displayed to a user based on a configuration by a home PLMN (HPLMN) on a universal integrated circuit card (UICC). Upon manually selecting the CSG cell, the UE's behavior is differentiated based on whether the selected CSG cell belongs to a registered PLMN or not.

SUMMARY

An aspect of the present disclosure provides a method, system, and apparatus for optimizing service recovery of UEs during manual CSG selection in wireless communication.

According to an aspect of the present disclosure, a method is provided for optimizing service recovery during manual CSG cell selection in an LTE network. A UE receives a registration rejection with a temporary cause from a network of a CSG cell selected through the manual CSG cell selection. It is determined from the registration rejection whether the temporary cause includes a cause value that allows the UE to return to a saved or previously visited PLMN. Service recovery of the UE is performed with a registered public land mobile network (RPLMN), if the temporary cause does not include the cause value that allows the UE to return to the saved or previously visited PLMN.

According to another aspect of the present disclosure, a user equipment (UE) on a first public land mobile network (PLMN) is provided for optimizing service recovery during manual CSG cell selection in a LTE network. The UE includes a communication device on the first PLMN that is configured to receive a registration rejection with a temporary cause from a second PLMN of a CSG cell selected through the manual CSG cell selection. The communication device is also configured to determine from the registration rejection whether the temporary cause includes a cause value that allows the UE to return to a saved or previously visited PLMN. The communication device is further configured to perform service recovery with the first PLMN, if the temporary cause does not include the cause value that allows the UE to return to the saved or previously visited PLMN.

According to another aspect of the present disclosure, a communication device of manufacture is provided for optimizing service recovery during manual CSG cell selection in an LTE network. The communication device of manufacture includes a non-transitory machine readable medium containing one or more programs which when executed implement the steps of: receiving a registration rejection with a temporary cause from a network of a CSG cell selected through the manual CSG cell selection; determining from the registration rejection whether the temporary cause includes a cause value that allows a UE to return to a saved or previously visited PLMN; and performing service recovery of the UE with an RPLMN, if the temporary cause does not include the cause value that allows the UE to return to the saved or previously visited PLMN.

According to another aspect of the present disclosure a method for enabling faster service recovery to the User Equipment (UE) during a Manual Closed Subscription Group (CSG) selection in LTE is provided. The method comprises steps of triggering by a UE, a manual selection of a CSG cell, performing a Tracking Area Update (TAU) on the selected CSG cell, receiving by the UE, a registration rejection with one or more temporary causes from a network for the selected CSG cell, checking if the registration is rejected with the temporary cause other than cause #25 and performing service recovery of the UE with a RPLMN.

According to another aspect of the present disclosure, service recovery for the UE during manual CSG selection is performed by at least one of retaining a Globally Unique Temporary ID (GUTI), previously visited registered TAI, Key Set Identifier (KSI) and Equivalent Public Land Mobile Network (EPLMN) lists, retrying registration multiple times on a single CSG cell, employing a preset PLMN for recovery procedures and performing the TAU instead of an Attach while returning to the preset PLMN thereby reducing the delay while recovering to the preset PLMN.

According to another aspect of the present disclosure, a system for optimizing service recovery during Manual Closed Subscription Group (CSG) selection in LTE is provided. The system comprises of an user equipment adapted for triggering manual selection of a CSG cell, performing a Tacking Area Update (TAU) on the selected CSG cell, receiving a registration rejection with one or more temporary causes from a network for the selected CSG cell, checking if the registration is rejected with the temporary cause other than cause #25 and performing service recovery with a RPLMN.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
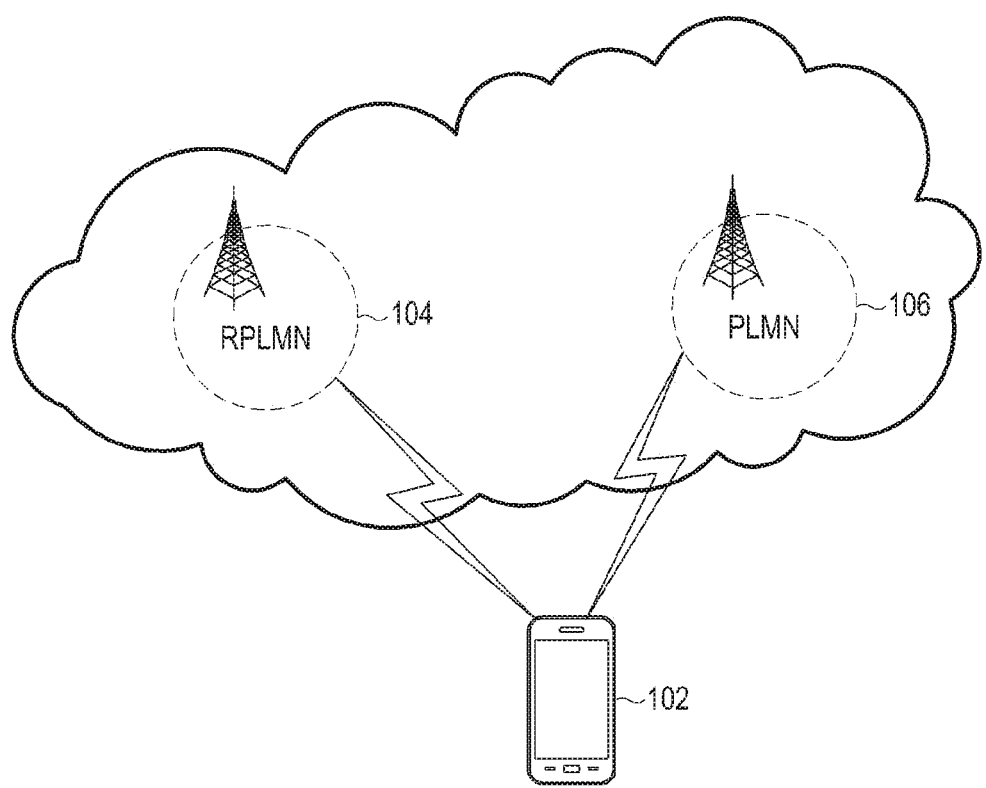
FIG. 1 is a diagram illustrating a method of optimizing selection of a CSG cell during manual CSG cell selection, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, "an", "one" or "some" embodiment(s) may be referred to. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including", and/or "comprising", as used herein, specify the presence of stated features, integers, steps, operations, elements, and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meanings as those commonly understood by one of ordinary skill in the art to which this disclosure pertains. It will be further understood that terms, such as those defined in commonly used dictionaries, should be interpreted as having meanings that are consistent with their meanings in the context of the relevant art, and will not be interpreted in an idealized or overly formal sense unless expressly so defined herein.

When a user selects a CSG ID from an available CSG list during manual CSG selection, the user is generally unaware of the registration status that is received in response to the selection. The user's registration onto the selected CSG cell is rejected with a particular cause value. Referring to $3^{rd}$ generation partnership project (3GPP) technical specification (TS) 24.301, a cause value #25 has been introduced for the CSG subscription rejection cases, which allows the UE to recover and go back to a saved or previously visited PLMN without any delay. Also, during manual CSG registration the network can send any reject cause other than cause value #25, when the CSG subscription fails.

As per the specification of the 3GPP, if the CSG subscription is rejected due to the user selection, contexts in the UE, such as security parameters, an equivalent PLMN (ePLMN) list, a globally unique temporary identifier (GUTI), etc., are deleted, evolved-universal terrestrial radio access (E-UTRA) is disabled, or a subscriber identity module (SIM) is invalidated. This causes the UE to go to limited services, and the UE may need to switch the radio access terminal (RAT) since the evolved universal mobile telecommunications system (UMTS) terrestrial radio access (EUTRA) is disabled. Further, a fresh registration procedure is required to be performed for UE recovery to receive normal services by moving back onto the saved PLMN. This registration procedure is not possible without a large delay or a power cycle.

When the UE is registered with a PLMN of a first operator on a non-CSG/CSG cell and the user initiates a manual CSG cell selection by selecting a CSG belonging to a PLMN of a second operator, if the CSG registration fails, it is rejected with temporary cause values other than #25. Further, if the EUTRA is disabled or the contexts are invalidated, then the UE will take long time to recover back to normal services.

FIG. 1 is a diagram illustrating a method of optimizing selection of CSG cell during manual CSG selection, according to an embodiment of the present disclosure. A UE 102 is registered onto an RPLMN 104 of a first operator in a network. The user initiates manual CSG selection by selecting the CSG belonging to a PLMN 106 of a second operator. The RPLMN 104 is saved for further reference. During manual CSG selection of the CSG cell, if the CSG registration on the PLMN 106 of the second operator fails, the UE 102 receives either a reject cause #25 or one or more temporary causes, other than cause #25, from the network. If the UE 102 receives cause #25, the UE 102 follows procedures specified in 3GPP TS 24.301, and returns to the RPLMN 104 of the first operator. If the UE 102 receives temporary causes other than cause #25, the UE 102 ignores the received reject cause actions and performs a recovery procedure using the RPLMN. Alternatively, if the UE 102 receives temporary causes other than cause #25 and the RPLMN 104 is not available, the UE 102 performs a normal service recovery using a HPLMN. Rejected CSGs are added to a-forbidden CSG (FCSG) list, and rejected tracking area identities (TAIs) are added to a-forbidden TAI (FTAI) list. For optimization, during automatic CSG selection, registration of the UE will not be attempted on CSG cells that are added to the FCSG list or the FTAI list until a next power cycle.

Figure 2:
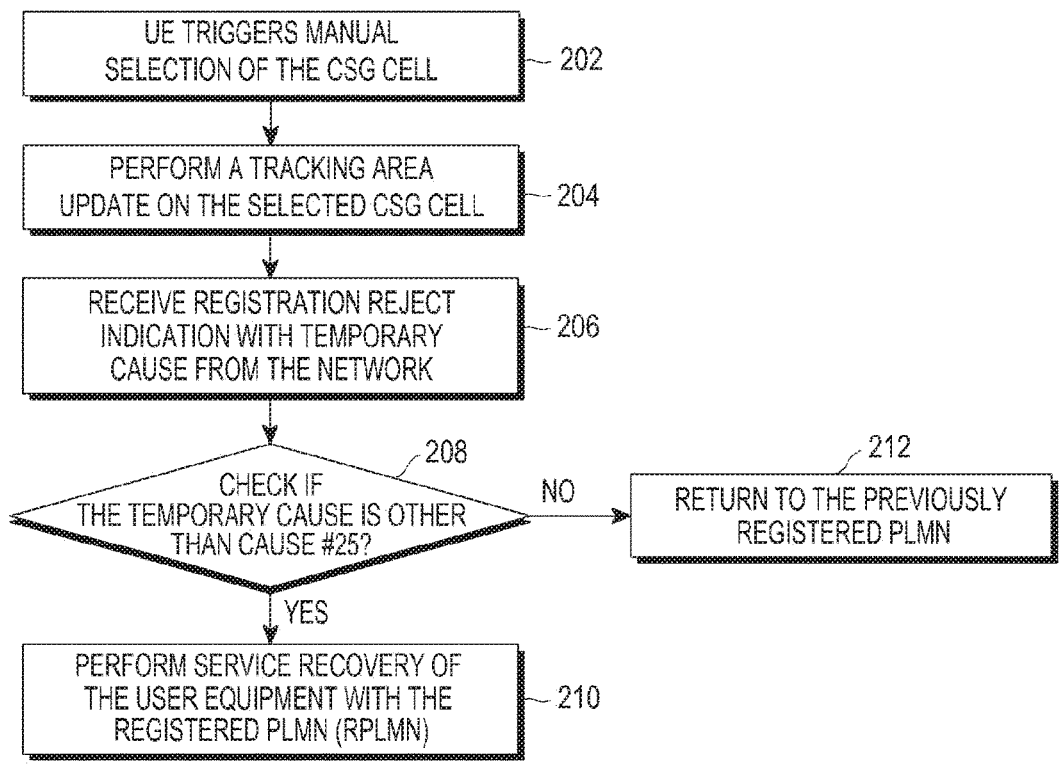
FIG. 2 is a flow chart illustrating a method of optimizing CSG cell selection during manual CSG cell selection, according to an embodiment of the present disclosure.

FIG. 2 is a flow chart illustrating a method of optimizing CSG cell selection during manual CSG selection, according to an embodiment of the present disclosure. In step 202, the UE triggers a manual selection of a CSG cell. In step 204, the UE performs a tracking area update (TAU) on the selected CSG cell. In step 206, the UE receives, from the network, a registration rejection indication with a temporary cause for the selected CSG cell. In step 208, the UE determines whether the temporary cause received is a cause #25. If the received reject cause is one other than cause #25, the UE performs service recovery with an RPLMN, in step 210. If the received reject cause is cause #25, the UE returns to the previously visited RPLMN, in step 212.

Figure 3:
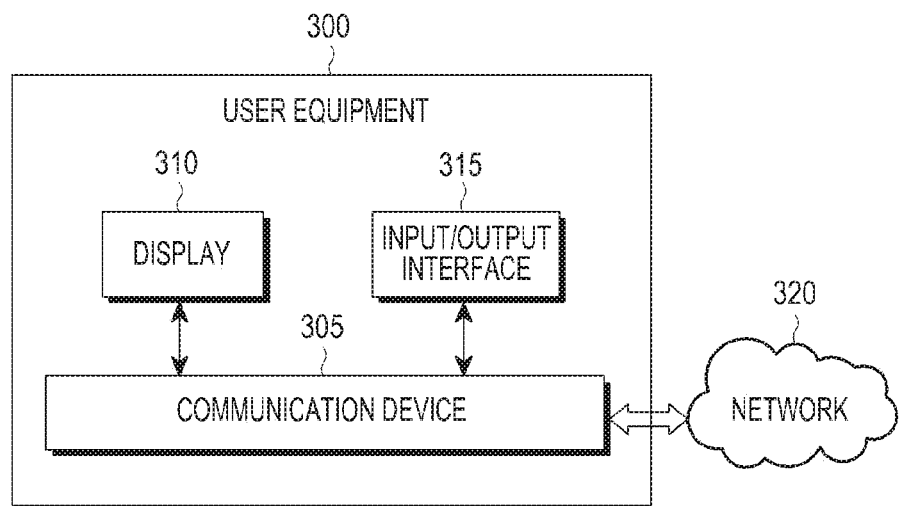
FIG. 3 is a block diagram of a UE in a network according to an aspect of the present disclosure.

Further, during service recovery, the UE ignores the received CSG registration reject cause and returns to the normal mode. The rejected CSGs are then added to an FCSG list or one or more TAIs are added to an FTAI list. FIG. 3 is a block diagram of a UE in a network according to an aspect of the present disclosure.

Referring to FIG. 3, a UE 300 may include a communication device 305. Alternatively, the UE 500 may further include at least one of a display 310 and an input/output interface 315.

The communication device 300 communicates with another entity (e.g., a base station or a UE) on a network 320. The communication device 305 may be a main object for performing overall operations of the UE 300 described in the present disclosure. The communication device 305 may also be referred to as a modem or a modem chip.

Examples of the display 315 may include a liquid crystal display (LCD), a light-emitting diode (LED) display, an organic LED (OLED) display, a microelectromechanical systems (MEMS) display, and an electronic paper display.

The input/output interface 315 may serve as an interface that may transfer instructions or data, which are input from a user or another external device to other component(s) of the UE 300. Further, the input/output interface 315 may output instructions or data received from other component(s) of the UE 300 to a user or an external device.

According to an aspect of the present disclosure, the UE 300 may further include a storage module (e.g., a memory) or a processor (e.g., an application processor (AP)).

Figure 4:
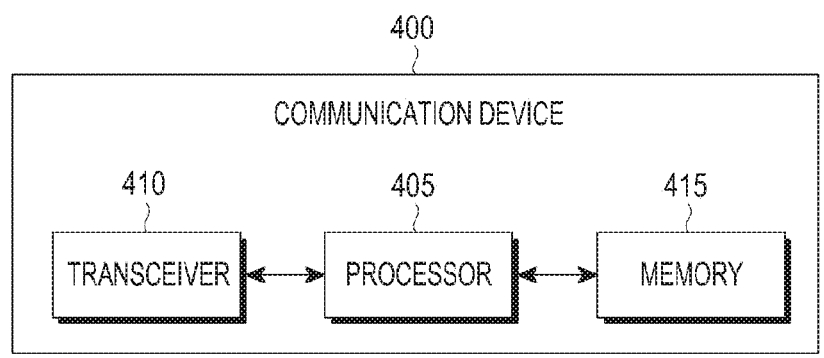
FIG. 4 is a block diagram of a communication device included in a UE according to an aspect of the present disclosure.

FIG. 4 is a block diagram of a communication device included in a UE according to an aspect of the present disclosure.

Referring to FIG. 4, the communication device 400 may include a transceiver 410 and a processor 405. Alternatively, the communication device 400 may further include a memory 415. In an embodiment of the present disclosure, the transceiver 410 may be omitted from the communication device 400.

The transceiver 410, for example, may perform communication between the communication device 400 and an external device. For example, the transceiver 410 may be connected to a network through a wireless or wired communication to communicate with the external device. The transceiver 410 may also be referred to as a communication module or a communication interface. Wireless communication may be, for example, cellular communication such as LTE, LTE-A, code division multiple access (CDMA), wideband CDMA (WCDMA), universal mobile telecommunications system (UMTS), wireless broadband (WiBro) or global system for mobile communication (GSM). In addition, wireless communication may include, for example, short range communication such as wireless fidelity (WiFi), Bluetooth, near field communication (NFC) and global navigation satellite system (GNSS).

All operations of the UE or the UE modem described in the present disclosure may be performed under control of the processor 405. However, the processor 405 and the transceiver 410 may not be implemented as separate devices, and may be implemented as one device such as a single integrated circuit or chip. The processor 405 may further include a communication processor (CP). The processor 405 may further include at least one of a central processing unit (CPU) and an AP. For example, the processor 405 may carry out operations or data processing related to control and/or communication of at least one other element of the electronic device 400. The processor may also be referred to as a control module, a control unit, or a controller.

The memory 415 may include a volatile memory and/or a non-volatile memory. The memory 415 may store, for example, commands or data related to at least one other component of the electronic device 400. The memory 415 may store software and/or a program. The program may include, for example, a kernel, a middleware, an application programming interface (API) and/or an application program (or an application), and the like.

Aspects of the present disclosure enable the UE to quickly recover back to normal services during manual CSG selection. The GUTI, and the last visited registered TAI, KSI, and EPLMN lists are not maintained for further reference. The rejected CSGs are added to the FCSG list to avoid multiple registration attempts on the same CSG cell. Further performing a TAU instead of an Attach while recovering the RPLMN reduces the delay in service recovery.

Various devices, modules, and the like, described herein, may be enabled and operated using hardware circuitry, for example, complementary metal oxide semiconductor based logic circuitry, firmware, software, and/or any combination of hardware, firmware, and/or software embodied in a machine readable medium. For example, various electrical structures and methods may be embodied using transistors, logic gates, and electrical circuits, such as, for example, an application specific integrated circuit.

The present aspects may be utilized in conjunction with the manufacture of integrated circuits, systems on chips, or chip sets. In general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this disclosure.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method of optimizing service recovery during manual closed subscription group (CSG) cell selection in a long term evolution (LTE) network, the method comprising:
   selecting, by a user equipment (UE), a CSG cell through the manual CSG cell selection;
   performing a tracking area update (TAU) procedure on the CSG cell;
   receiving a registration rejection with a temporary cause from a network of a CSG cell selected through the manual CSG cell selection;
   determining from the registration rejection whether the temporary cause comprises a cause value that allows the UE to return to a saved or previously visited public land mobile network (PLMN); and
   performing service recovery of the UE with a registered PLMN (RPLMN), upon determining that the temporary cause does not comprise the cause value that allows the UE to return to the saved or previously visited PLMN, wherein the RPLMN is different from the saved or previously visited PLMN,
   wherein the service recovery of the UE is performed by at least one of:

retaining a globally unique temporary identifier (GUTI), previously visited registered tracking area identity (TAI), key set identifier (KSI) and equivalent PLMN (EPLMN) lists;
retrying registration on a single CSG cell;
employing the RPLMN for recovery procedures; and
performing the TAU procedure instead of an Attach while returning to the RPLMN thereby reducing the delay while recovering to the RPLMN.

2. The method of claim 1, further comprising:
saving the RPLMN upon selection of the CSG cell through the manual CSG cell selection.

3. The method of claim 1, further comprising returning to a previous PLMN, if the temporary cause comprises the cause value that allows the UE to return to the saved or previously visited PLMN.

4. The method of claim 1, wherein the saved or previously visited PLMN is the RPLMN.

5. The method of claim 1, wherein the cause value that allows the UE to return to the saved or previously visited PLMN is cause #25.

6. The method claim 1, wherein performing service recovery of the UE comprises:
ignoring the temporary cause in the registration rejection;
adding the CSG cell to a forbidden CSG (FCSG) list; and
adding one or more TAIs to a forbidden TAI (FTAI) list.

7. The method of claim 1, further comprising:
preventing registration attempts on CSG cells on the FCSG list and the FTAI list during a subsequent automatic CSG cell selection.

8. The method of claim 1, further comprising performing service recovery using normal service recovery actions if the RPLMN is not available.

9. A user equipment (UE) on a first public land mobile network (PLMN) for optimizing service recovery during manual closed subscription group (CSG) cell selection in a long term evolution (LTE) network, the UE comprising:
a communication device configured to:
select a CSG cell through the manual CSG cell selection;
perform a tracking area update (TAU) procedure on the CSG cell;
receive a registration rejection with a temporary cause from a second PLMN of a CSG cell selected through the manual CSG cell selection;
determine from the registration rejection whether the temporary cause comprises a cause value that allows the UE to return to a saved or previously visited PLMN; and
perform service recovery with the first PLMN, upon determining that the temporary cause does not comprise the cause value that allows the UE to return to the saved or previously visited PLMN, wherein the first PLMN is different from the saved or previously visited PLMN,
wherein the service recovery of the UE is performed by at least one of:
retaining a globally unique temporary identifier (GUTI), previously visited registered tracking area identity (TAI), key set identifier (KSI) and equivalent PLMN (EPLMN) lists;
retrying registration on a single CSG cell;
employing the first PLMN for recovery procedures; and
performing the TAU procedure instead of an Attach while returning to the first PLMN thereby reducing the delay while recovering to the first PLMN.

10. The UE of claim 9, wherein the communication device is further configured to:
save the first PLMN upon selection of the CSG cell through the manual CSG cell selection.

11. The UE of claim 9, wherein the communication device is further configured to:
return to the first PLMN, if the temporary cause comprises the cause value that allows the UE to return to the saved or previously visited PLMN.

12. The UE of claim 9, wherein the cause value that allows the UE to return to the saved or previously visited PLMN is cause #25.

13. The UE of claim 9, wherein the communication device performs service recovery of the UE by:
ignoring the temporary cause in the registration rejection;
adding the CSG cell to a forbidden CSG (FCSG) list; and
adding one or more TAIs to a forbidden TAI (FTAI) list.

14. The UE of claim 9, wherein the communication device is further configured to:
prevent registration attempts on CSG cells on the FCSG list and the FTAI list during a subsequent automatic CSG cell selection.

15. The UE of claim 9, wherein the communication device is further configured to:
perform service recovery using normal service recovery actions if the first PLMN is not available.

16. A communication device of manufacture for optimizing service recovery during manual closed subscription group (CSG) cell selection in a long term evolution (LTE) network, comprising a non-transitory machine readable medium containing one or more programs which when executed implement the steps of:
selecting, by a user equipment (UK), a CSG cell through the manual CSG cell selection;
performing a tracking area update (TAU) procedure on the CSG cell;
receiving a registration rejection with a temporary cause from a network of a CSG cell selected through the manual CSG cell selection;
determining from the registration rejection whether the temporary cause comprises a cause value that allows the UE to return to a saved or previously visited public land mobile network (PLMN); and
performing service recovery of the UE with a registered PLMN (RPLMN), upon determining that the temporary cause does not comprise the cause value that allows the UE to return to the saved or previously visited PLMN, wherein the RPLMN is different from the saved or previously visited PLMN,
wherein the service recovery of the UE is performed by at least one of:
retaining a globally unique temporary identifier (GUTI), previously visited registered tracking area identity (TAI), key set identifier (KSI) and equivalent PLMN (EPLMN) lists;
retrying registration on a single CSG cell;
employing the RPLMN for recovery procedures; and
performing the TAU procedure instead of an Attach while returning to the preset PLMN thereby reducing the delay while recovering to the RPLMN.

* * * * *